Feb. 16, 1932.  D. G. MEIKLE ET AL  1,845,091
MACHINE FOR MAKING WIREBOUND BOX BLANKS
Filed Aug. 19, 1929   8 Sheets-Sheet 8
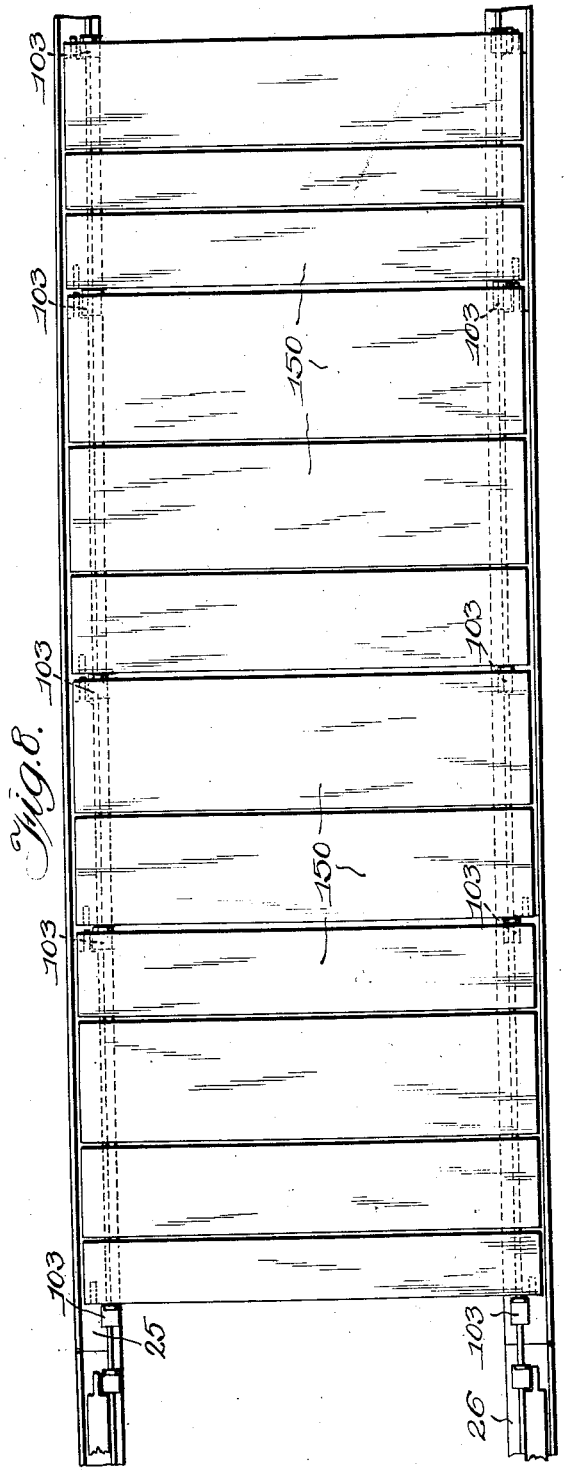
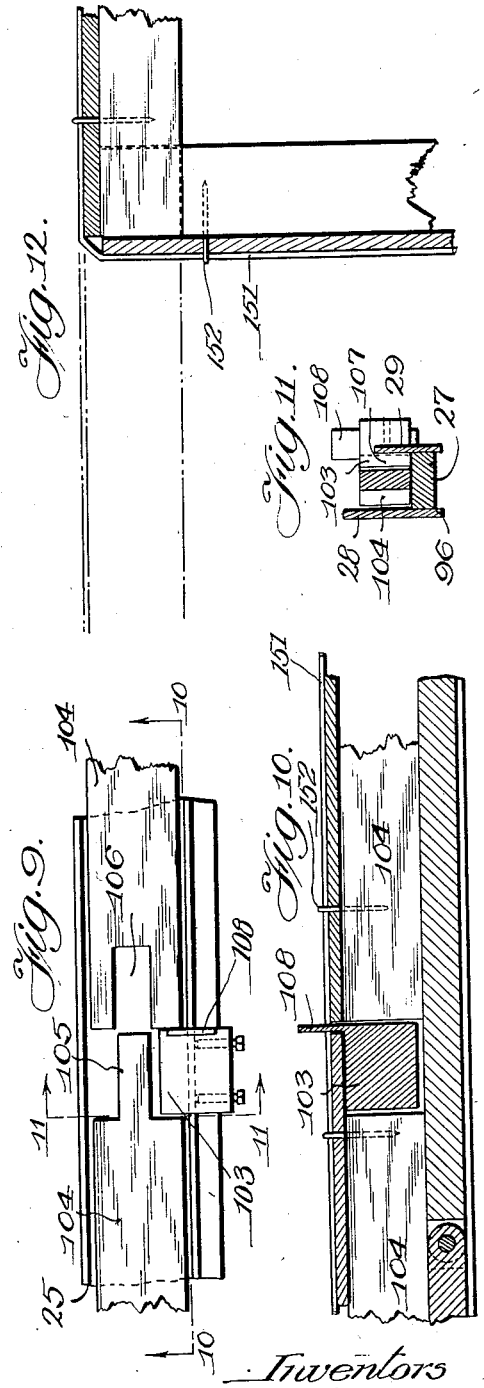

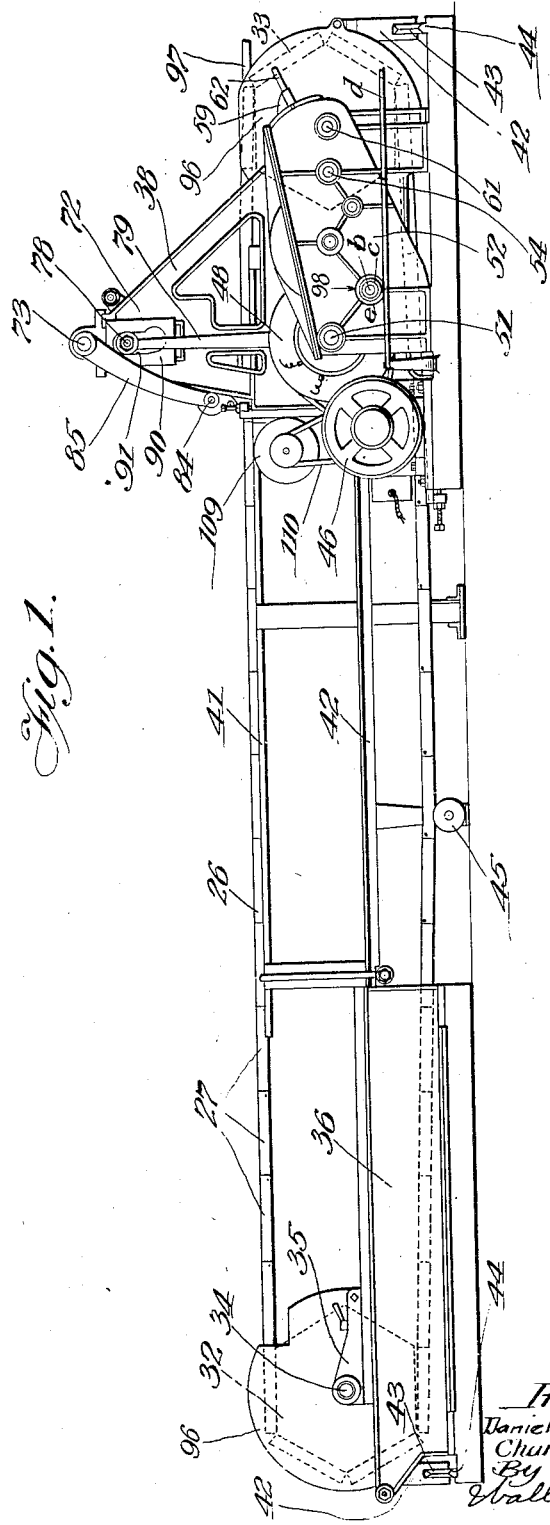

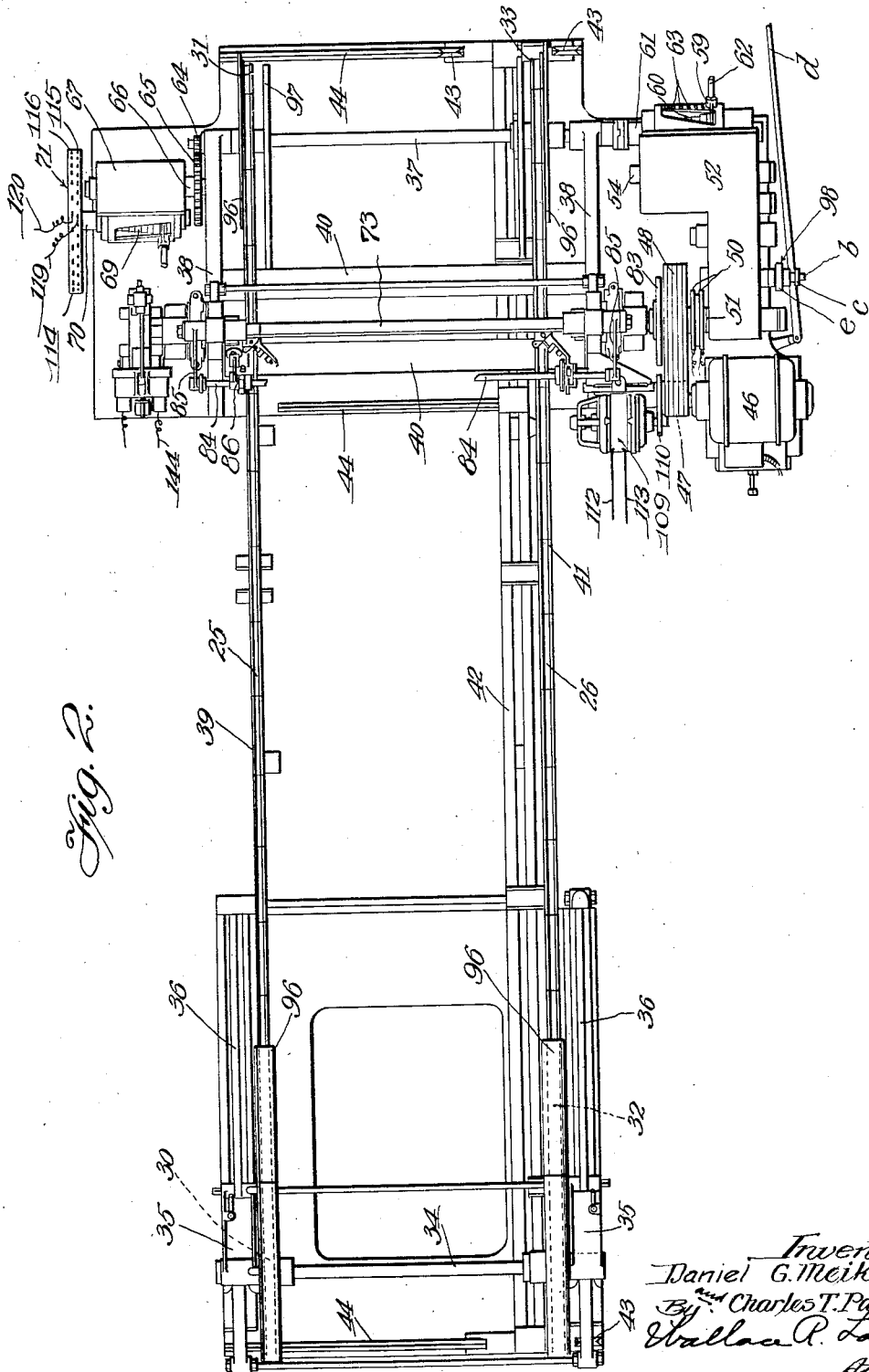

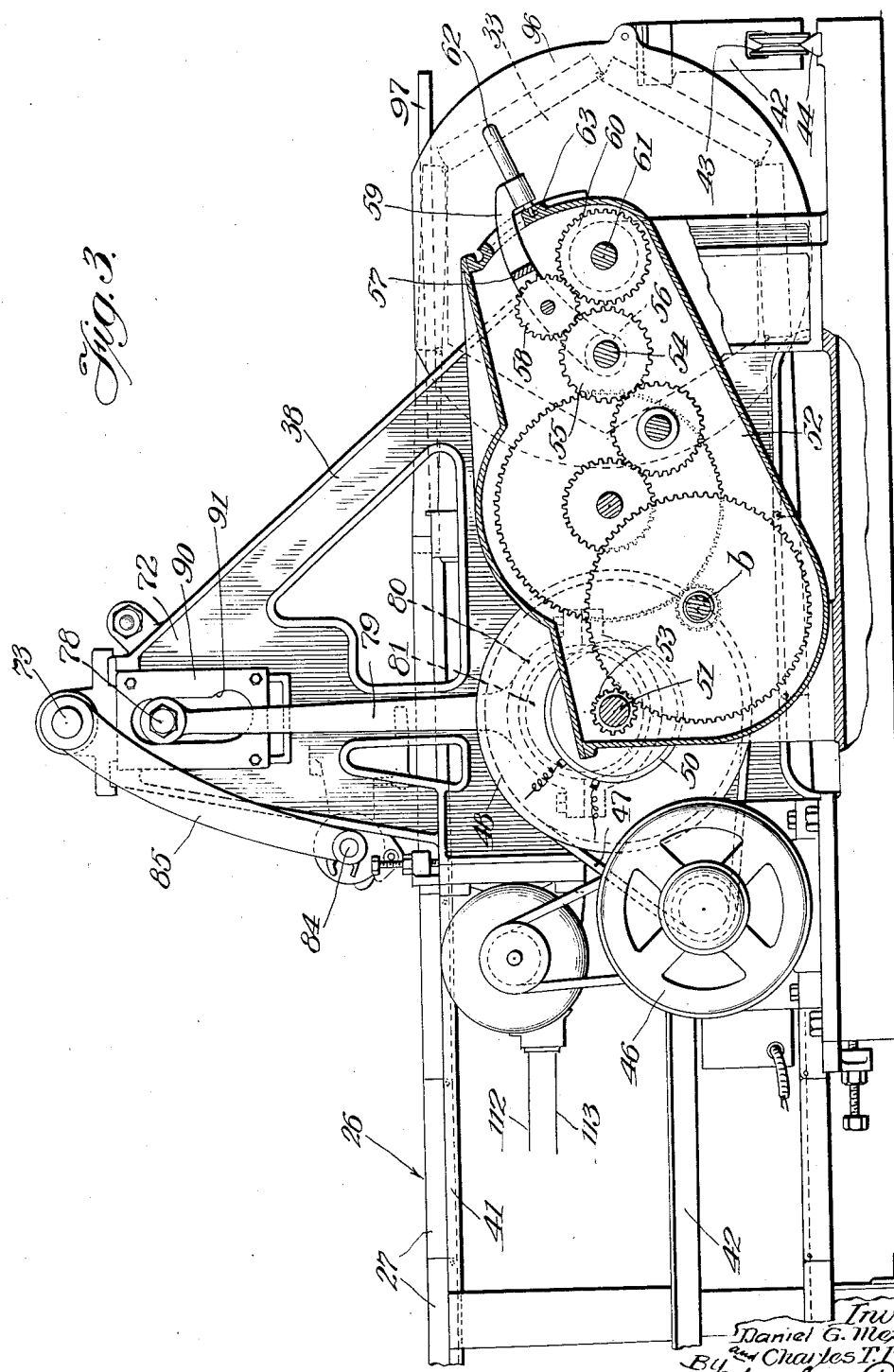

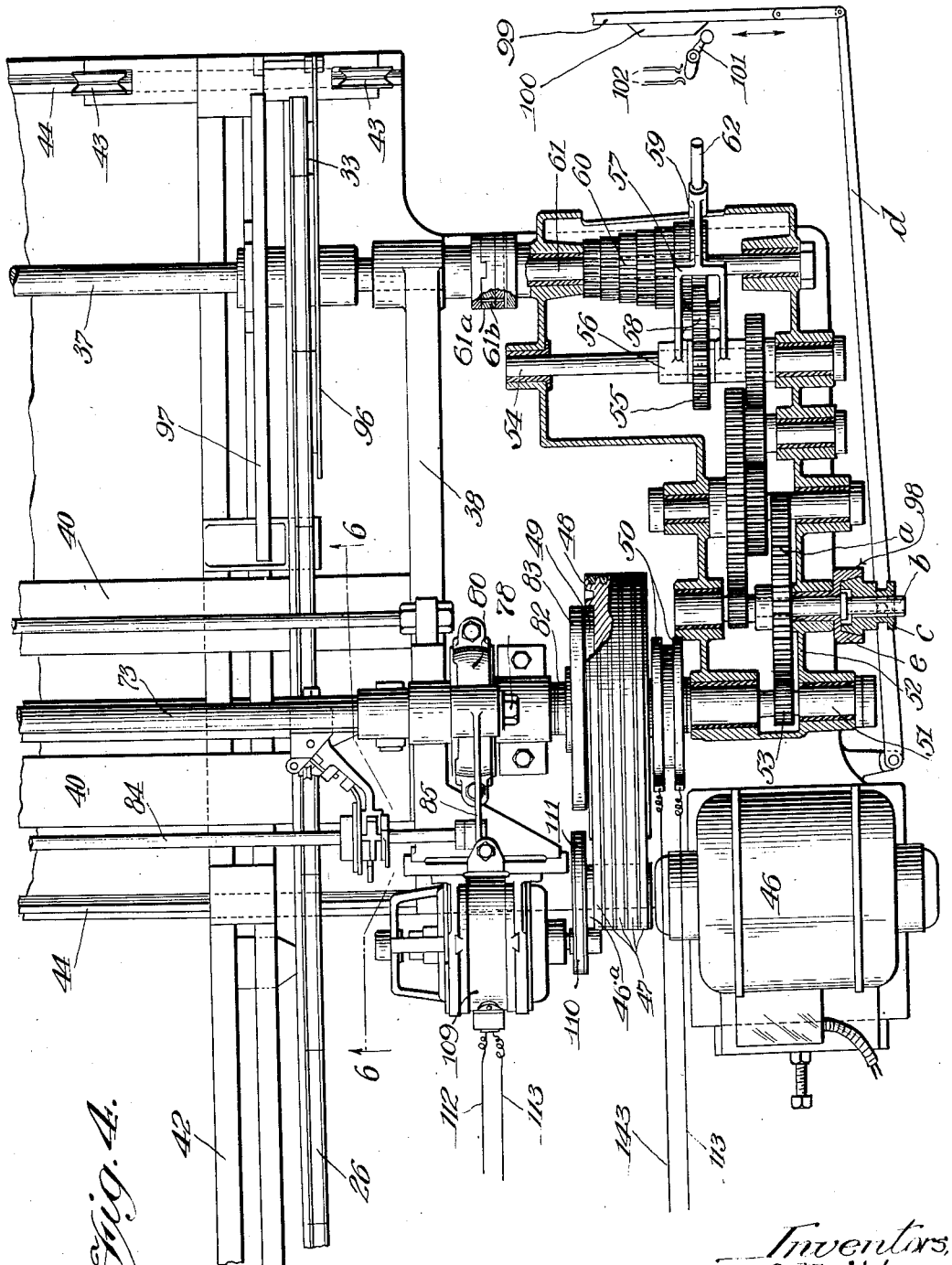

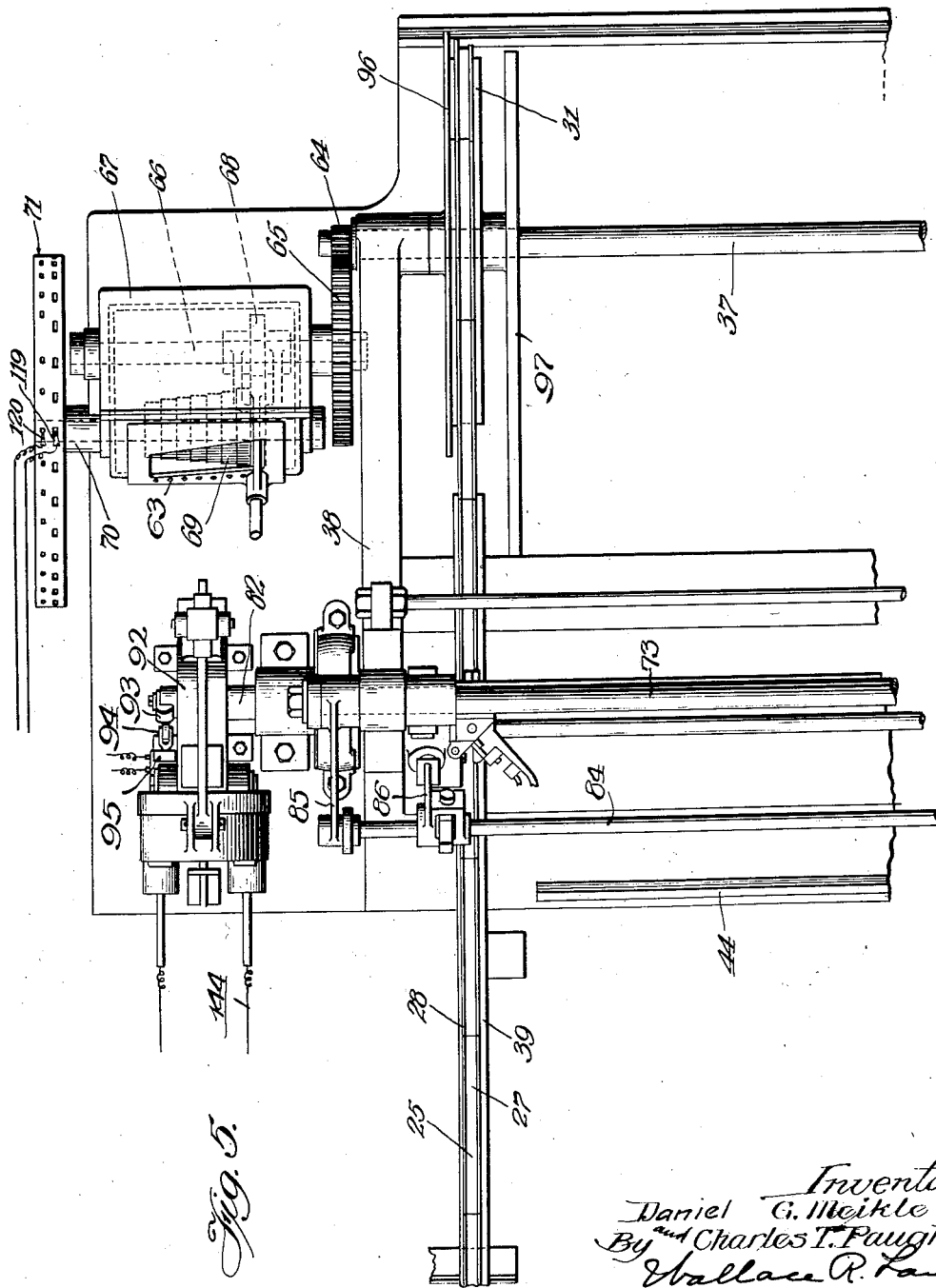

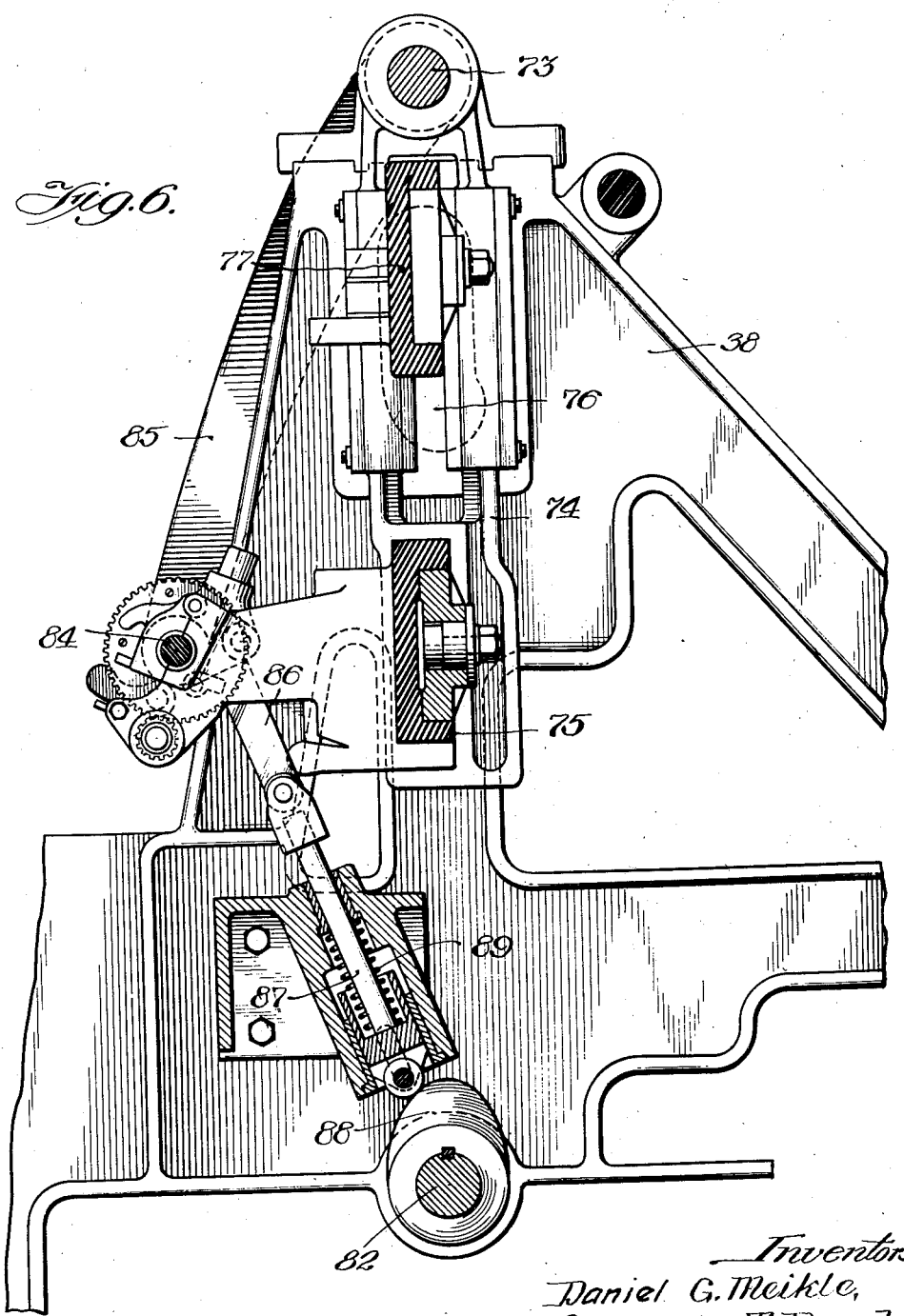

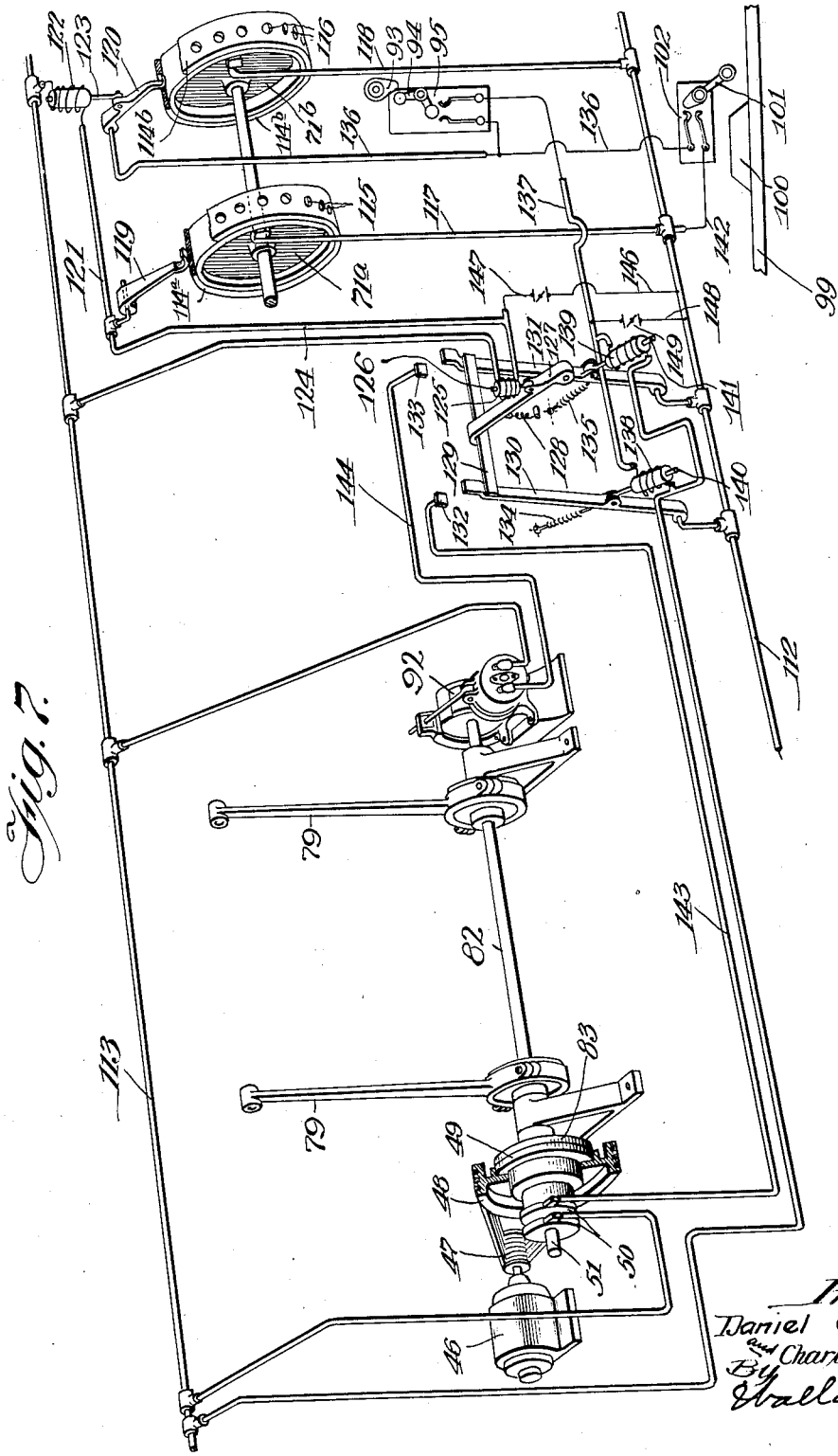

Patented Feb. 16, 1932

1,845,091

UNITED STATES PATENT OFFICE

DANIEL G. MEIKLE, OF LOUISVILLE, KENTUCKY, AND CHARLES T. PAUGH, OF DETROIT, MICHIGAN, ASSIGNORS TO GENERAL BOX COMPANY, OF CHICAGO, ILLINOIS, A CORPORATION OF DELAWARE

MACHINE FOR MAKING WIREBOUND BOX BLANKS

Application filed August 19, 1929. Serial No. 387,030.

The invention relates to machines for making wire bound box blanks.

One of the objects of the invention is to provide an electrically controlled machine which is adapted to drive staples in the sides of a box blank at regular intervals depending upon the setting of the machine.

A further object of the invention is to provide a machine in which the stapling mechanism is adapted to operate continuously on a side of the box blank, being automatically arrested by electrical means so as to avoid driving of staples into the lines of junction of adjacent sides.

A further object of the invention is to provide a machine in which the stapling mechanism is adjusted to be started by an electric circuit so as to drive the first row of staples in each side at a predetermined position and thereafter drive successive rows of staples at regular intervals, depending upon the initial setting of the machine and become arrested by an electric circuit so as to avoid driving staples too near the line of junction between adjacent sides of the box blank.

A further object of the invention is to provide a machine in which the stapling mechanism is adapted to be operated continuously so as to drive successive rows of staples at uniform distance and in which an electric circuit controller operable in unison with the work is provided for the purpose of controlling the starting and stopping of the stapling mechanism so as to avoid driving staples too near the lines of junction between adjacent sides of the box blank.

A further object of the invention is to provide a machine in which the work is carried uniformly past stapling mechanism adapted to operate uniformly so as to drive staples with regular spacing, said stapling mechanisms being operated through a magnetic clutch which is adapted to be automatically disengaged at intervals so as to avoid driving staples too near the lines of junction between adjacent sides of a box blank.

A further object of the invention is to provide a machine in which the stapling mechanism is adapted to be disengaged at intervals and become arrested by a magnetic brake at a predetermined position.

A further object of the invention is to provide an electrically controlled machine in which the work is conveyed at uniform speed past stapling mechanisms operated at uniform speed, the relative speed of operation of the work and stapling mechanisms being adjustable so that successive rows of staples are driven into the work at uniform spaced intervals.

A further object of the invention is to provide a machine which is electrically controlled, the control being determined by a removable member suitably prepared for a particular set-up of the machine.

A further object of the invention is to provide a machine which is controlled by a removable and replaceable perforated strip of insulating material which is adapted to control circuits for the controlling mechanisms.

A further object of the invention is to provide a machine in which the work is carried forward uniformly and the stapling mechanisms are operated uniformly and electric control means associated with the work drive are adapted to control the clutching and declutching of a magnetic clutch so as to start and arrest the stapling mechanism at the beginning and end of the stapling of a box side.

A further object of the invention is to provide a machine which is controlled by a contact drum and a pair of contacts adapted to make circuits therewith for the purpose of starting and stopping the stapling mechanism at desired points.

Other objects, advantages and capabilities will later more fully appear.

Our invention further resides in the combination, construction and arrangements of parts illustrated in the accompanying drawings and while we have shown herein a preferred embodiment we wish the same to be understood as illustrative only and not limiting the scope of our invention.

In the drawings,

Figure 1 is an elevation of the machine as seen from the right hand side thereof.

Fig. 2 is a plan of the machine,

Fig. 3 is a sectional elevation, on a larger scale showing the rear end of the machine as viewed from its right hand side, the near side of the gear box 52 being cut away, Fig. 4 is a plan view, on a similar scale showing the right hand rear portion of the machine.

Fig. 5 is a similar plan of the left hand rear portion of the machine.

Fig. 6 is a sectional elevation of part of the machine taken on the line 6—6 of Fig. 4, Fig. 7 is a diagrammatic view showing the electric circuits, Fig. 8 is a plan view showing the box blank assembly applied to the chains 25 and 26, Fig. 9 is a fragmentary plan view of the left hand chain 25 showing the relation of the cleats to one of the spacers, Fig. 10 is a sectional view on the line 10—10 of Fig. 9, Fig. 11 is a transverse section on the line 11—11 of Fig. 9, and Fig. 12 is a sectional detail showing adjacent box sides brought into rectangular relation in the formation of a box from the stapled box blank.

Referring to the drawings, the numerals 25 and 26 designates conveyor chains which are adapted to carry the assembled box blank during manufacture thereof. Said chains are constituted by links 27 of substantial length, pivoted together at their ends so as to constitute endless chains. Each link is provided with a relatively high upstanding wall 28 on its exterior side, while on its interior side it is provided with a relatively low upstanding wall 29. The groove or recess between said walls is adapted to receive the cleats which are to form part of the box blank. The chain 25 is carried upon a forward sprocket wheel 30 and a rear sprocket wheel 31 while the chain 26 is carried by a forward sprocket wheel 32 and a rear sprocket wheel 33. Said sprocket wheels are preferably hexagonal in shape, having sides corresponding in length to the length of the links 27. Said sides are preferably recessed to form seats for the links 27.

The sprocket wheels 30 and 32 are keyed or otherwise rigidly mounted upon a shaft 34 which is rotatably mounted in blocks 35, which are supported slidably on side frames 36, along which they may be adjusted so as to adapt the machine to receive chains of different lengths.

The sprocket wheels 31 and 33 are keyed to or otherwise rigidly mounted upon a shaft 37 which is rotatably mounted in the main side frames 38 of the machine.

The upper length of the chain 25, between the sprocket wheels 30 and 31 is supported upon a rail 39, which is recessed on its upper surface to receive said chain.

Said rail 39 is supported by suitable supports and also on transverse frame member 40 which connects the main side frames 38, so as to provide said rail with a firm abutment when the staples are being driven into the cleats carried thereby.

A similar rail 41 is provided for supporting the upper lengths of the chain 26. Said rail is supported by a carriage 42 which extends longitudinally of the machine and is adjustable transversely thereof, being provided with wheels 43 which are adapted to engage transverse rails 44.

The lower length of the chain 26 is supported by pulley wheels 45 which are also mounted on the carriage 42. Similar wheels (not shown) are mounted on the frame of the machine for the support of the under length of the chain 25.

The machine is driven from the motor 46, the pulley $46^a$ of which is connected by a belt 47 to a pulley 48, mounted on the field member 49 of a magnetic clutch, the collector rings of which are designated 50. The field member 49 is mounted upon a shaft 51 which is journaled in a gear box 52. Within said gear box, said shaft 51 is provided with a small spur wheel 53 which drives a train of reducing gears (including a clutch later described) mounted in said gear box 52 which drives the shaft 54, also journaled in said gear box, at a relatively low speed. Slidably mounted on the shaft 54 and caused to rotate therewith, for example, by means of a projection and keyway is a gear 55 which is engaged on either side by collars 56 of a bifurcated lever 57.

A gear 58 is rotatably mounted on said bifurcated lever 57 so as to intermesh with the gear 55. Said lever 57 is provided with a handle portion 59 which projects through a slot in the gear box 52 to the exterior thereof so that the gears 55 and 58 may be moved transversely with respect to the machine and the gear 58 brought into cooperative contact with a selected one of a series of gears 60 of gradually decreasing diameter. These gears 60 are mounted upon a shaft 61 which is journaled in the gear box 52 and projects through the wall thereof, the outer end of the shaft 61 being united by way of an Oldham coupling or universal joint $61^a$ with the shaft 37 to drive the sprocket wheels 31 and 33, and thereby the chains 25 and 26.

The projecting portion 59 of the lever 57 is provided with a spring pressed pin 62 which is adapted to engage in openings 63 in the gear box wall so as to maintain the gear 58 in cooperative contact with any selected one of the gears 60.

As will be more fully understood from the following description, the staple forming and driving mechanism is driven directly from the field member 49 so that the relative speeds of the field member 49 and the shaft 37 determine the distance between consecutive staples. By adjustment of the gears 58 and 60 this spacing may be controlled within desired limits. For example, with seven gears 60 it is possible to obtain staple spacings of 1½, 1⅝, 1¾, 1⅞, 2, 2⅛, and 2¼ inches. Obviously, it is possible to modify these gear trains and the sizes of the gears 60 so as to obtain any desired range of spacing and any desired increments thereof.

On the left hand side of the machine, beyond the side frame 38, the shaft 37 is provided with a small gear 64 which intermeshes with a relatively large gear 65, mounted on a shaft 66 which is journaled in a gear box 67. Rotatable with said shaft 66 and slidable thereon is a gear 68 which is adapted to drive any selected one of a series of gears 69 of varying diameter in the same manner as previously described in connection with gears 55 and 60. The gears 69 are mounted upon a shaft 70 which is journaled in the gear box 67 and projects therefrom. At its outer end the shaft 70 carries the contact drum 71. The purpose of the gear shift provided by the gears 69 is to permit time of revolution of the drum 71 to be adjusted to correspond with a complete cycle of the chains 25 and 26, the length of which can be varied as previously indicated. For example, with eight gears 69, as illustrated, it is possible to adjust the time of revolution of the contact drum 71 to correspond with the time of a complete cycle of a chain with 29, 30, 31, 32, 33, 34, 35 or 36 links. Of course, it will be understood that any different number of gears may be employed, if desired, and that the number of links corresponding thereto and the increment between them may be varied at will.

The main side frames 38 are provided, at a position intermediate between the forward sprocket wheels 30 and 32 and the rear sprocket wheels 31 and 33, with upstanding portions 72 which are connected by a transverse bar 73. Adjacent the inner faces of the said side frames 38 are provided a pair of cheeks 74, which are pivotally suspended from the bar 73. The cheeks 74 are connected rigidly at their lower ends by a crosshead 75 which is intended to support the lower portions of the stapling mechanism (not shown). Above said crosshead 75 said cheeks are provided with vertical slots 76, which are intended to guide the crosshead 77, which is intended to carry the upper portions of the stapling mechanism (not shown). The crosshead 77 is provided with projecting portions 78, which are pivotally engaged by the upper ends of pitmen 79, the lower ends of which are provided with eccentric straps 80 which ride on the eccentrics 81. Said eccentrics 81 are mounted on the outer sides of the frame members 38, upon a shaft 82 which is journaled in the main frame members 38. At its right hand end, that is the end shown in Fig. 4, the shaft 82 rigidly carries the armature member 83 which is adapted to cooperate with the field member 49. As shown in the drawings the shaft 51 and the shaft 82 are in alignment so that when the field member 49 is energized the field member and the armature 83 enter into magnetic engagement. Spring means (not shown) are provided for separating the armature and field member when the latter becomes deenergized.

The means for feeding the staple wire to the stapling mechanisms comprises the transverse shaft 84 which is mounted at the ends of the swinging arm 85, which are pivotally mounted on the transverse bar 73 on the exterior of the main frame members 38. This mounting enables the transverse shaft 84 to be raised away from the stapling mechanisms for the purpose of adjustment or repair. In its operative position the shaft 84 is received in bearings provided in brackets which are integral with the lower portions of the stapling mechanisms, which are mounted upon the lower crosshead 75.

The transverse shaft 84 carries feed wheels which feed staple wire into the stapling mechanisms. The transverse shaft 84 is given a periodic step-by-step movement by means of the rod 86, which is connected thereto by a pawl and ratchet. The rod 86 is pivotally connected to the guided rod 87. Said rod 87 carries at its lower end a roller which rides upon a cam 88. A spring 89 is provided which forces the rod 87 downwardly so as to keep said roll in contact with the cam 88. Means are provided to cause the stapling mechanisms to move in the same direction as the work and at substantially the same speed during the driving of the staples. For this purpose plates 90 are mounted on the exterior sides of the frame members 38. Said plates are provided with slots 91 which are substantially vertical but which curve slightly toward their lower ends rearwardly as shown in Fig. 3. The projecting portions 78 of the reciprocating crosshead 77 pass through the slots 91 and are provided with members which are snugly engaged thereby. It will be readily understood that as the crosshead 77 is pulled downwardly by the pitmen 79, the slots 91 cause the crosshead to move in a vertical path, so that the cheeks 74, in which said crosshead is guided, remain stationary. When the crosshead 77 approaches its lower extreme movement, that is, when the staple is being driven, the projecting portions 78 of the crosshead 77 are caused by the curved portions of the slots 91 to move rearwardly and thereby cause the cheeks 74 together with the stapling mechanisms mounted thereon to move rearwardly together with the work and at substantially the same speed. Consequently there is no dragging or deformation of the staples during driving.

At the left hand side of the machine, that is, beyond the left hand frame member 38, the shaft 82 is provided with a magnetic brake 92 of suitable type. Said brake is automatically applied by spring pressure and is released by the passage of electric current through the brake coils. As will be more particularly described hereinafter the brake 92 is adapted to be applied to stop the rotation of the shaft 82 shortly after the field member 49 of the clutch has become deenergized, while the circuits which provide current for the clutching of said clutch and the release of said brakes are made simultaneously.

At its left extremity, that is beyond the brake 92, the shaft 82 is provided with a cam 93 which is adapted to operate a lever 94 to effect closing of a switch 95 for the purpose hereinafter to be described.

The chains 25 and 26 are provided with guards 96 while they are passing over the sprocket wheels 30, 31, 32 and 33.

Behind the stapling mechanisms and between the chains 25 and 26, are provided longitudinal rails 97, which are located below the level of the work and are adapted to remove same from the rear wheels 31 and 33, said rails 97 extending rearwardly beyond said wheels.

Between the shafts 37 and 61 is provided a universal joint or coupling 61ª of Oldham type, for operatively connecting said shafts. This coupling is designed to compensate for any mis-alignment between said shafts or between the frame and the gear box, and also for preventing overload on the work chains of the machine. It comprises a pair of center discs connected together by a shear pin 61ᵇ such that in case of overload, the pin will shear and thus prevent damage to the other parts of the machine.

It is then only necessary to replace the pin when the jam is released and the chain free to travel again. These discs are engaged with hubbed discs secured to the ends of shafts 37 and 61, by tongues and grooves which are radially disposed and with the tongue and groove of a central disc and its companion hubbed disc, at right angles to the tongue and groove of the other central disc and its companion hubbed disc.

For the purpose of effecting a driving through the gear train, a clutch 98 is associated with shaft $b$ idly carrying gear $a$ which is driven by the pinion 53. The hub of gear $a$ carries a clutch element $e$, and the end of shaft $b$ has splined to it a cooperating clutch element $c$ such that when the latter is slid along shaft $b$ and engaged with clutch element $e$, the drive is effected from pinion 53 by way of gear $a$, clutch elements $e$ and $c$, and shaft $b$ to the train of gears.

The clutching and unclutching of this means is by way of a lever $d$ pivoted to a fixed part of the motor casing and carrying a suitable yoke cooperative with an annular part of the clutch element $e$, the other end of the lever $d$ being linked to a bar 99 carrying a cam 100 adapted to operate a switch element 101 into contact with contacts 102. Closing of this switch results in stopping the operation of the stapling mechanism in a predetermined position or relation of parts, as more fully later explained.

Spacers 103 are mounted upon the inner walls 29 of the chains 25 and 26. Said spacers are located oppositely on the chains and are removably applied to said chains so as to be located adjacent the lines of junction between adjacent sides of the box blank. The shape of the spacers 103 depends upon the nature of the joint between adjacent cleats in the finished box. For example when the ends of said cleats 104 are provided at their ends with tongues 105 and slots 106, as shown in Figs. 8 to 10 of the drawings, the spacers 103 may be parallelepiped in shape and may be provided with a slot whereby they engage the interior walls 29 of the chains 25 and 26, being firmly and removably attached thereto by means of set screws. Thus part 107 of the spacer 103 is located within the inner wall 29 and is adapted to form an abutment for the slotted end of one cleat and for the shoulder of the tongued end of the adjacent cleat, as clearly shown in Fig. 9. Also as shown in Fig. 9 the tongue and slots of said cleats are in the vertical position when placed upon the chains, and said tongues register with the ends of said slots. At their forward ends the spacers 103 are provided with ribs or upstanding narrow projections 108 for the purpose of facilitating the placing of veneer upon the cleats, as will be more fully described hereinafter.

Suitably mounted upon the frame of the machine, adjacent to the motor 46 is a direct current generator 109, which supplies current for the control of the machine. The generator is operated by a belt 110, which is driven by a pulley 111 mounted on the shaft of the motor 46 beyond the pulley 46ª.

The power lines from the generator 109 are designated 112 and 113.

The drum 71 is provided with a strip of insulating material which is provided with two series 115 and 116 of openings for the purpose hereinafter to be described. For ease of illustration the drum 71 is illustrated in Fig. 7 as two drums 71a and 71b mounted in spaced relation upon a single axis and the strip of insulating material 114 is shown in two parts mounted on said drums, said parts being designated 114a and 114b respectively. A suitable lead 117 extends from the power line 112 and makes contact with the drum 71a, while a similar lead 118 extends from said power line and makes contact with the drum 71b. A spring pressed contact point 119 is adapted to engage with the strip 114a and extends through the opening 115 therein so as to make electrical contact with the drum 71a. A similar spring pressed contact 120 rides upon the strip 114b and is adapted to enter the openings 116 therein and make contact with the drum 71b. From the contact 119 a conductor 121 extends to a solenoid 122, the other end of the winding thereof being connected to the power line 113. The armature 123 of the solenoid 122 is pivotally connected to the contact 120, so that when the solenoid 122 is energized, the contact 120 is drawn out of contact with the drum 71b. Another conductor 124 extends from the contact 119 to a solenoid 125, the other end of the winding of which, is connected to the power line 113. The armature 126 of the solenoid 125 is pivotally connected to a pivoted latch member 127 so that when said solenoid is energized the latch member 127 is raised for a purpose hereinafter described.

The latch 127 is normally drawn downwardly by a spring 128.

The forward end of the latch member 127 is adapted to engage a bridge member 129 of insulating material. Said bridge member connects the pivoted switch levers 130 and 131 which are electrically connected to the power line 112 and are adapted to make connection with the contacts 132 and 133 respectively.

Tension springs 134 and 135 are provided, which tend to move the switch arms 130 and 131 into contact with the contacts 132 and 133. The forward end of the latch member 127 is arranged so as to receive bridge member 129 when said member is drawn back and hold switch arms 130 and 131 out of contact with the contacts 132 and 133 until the solenoid 125 is energized.

The contact point 120 is connected by a conductor 136 to a terminal on each of the switches 102 and 95. The other terminal of the switch 95 is connected by a conductor 137 in parallel to the solenoids 138 and 139. The armatures 140 and 141 of said solenoids respectively, are pivotally connected to the bridge arms 130 and 131 so that when said solenoids are energized said switch arms are drawn backwardly and connection with the contacts 132 and 133 is broken. The other ends of the windings of the solenoids 138 and 139 are connected to the power line 113. The other end of the switch 102 is connected by conductor 142 to the power line 112.

The contact 132 is connected by a conductor 143 to the brush of one of the collector rings 50 of the clutch field member 49, the brush of the other collector ring being connected to the power line 113. The contact 133 is connected by conductor 144 to one terminal of the winding of the brake 92. The other terminal of said winding is connected to the power line 113.

A conductor 146 provided with a momentary contact switch 147 connects the power line 112 and the conductor 124 for the purpose of engaging the clutch and releasing the brake, thus causing the stapling mechanisms to operate irrespective of the position of the drum 71.

A conductor 148 provided with a set switch 149, connects the power line 112 and the conductor 137 for the purpose of maintaining the stapling mechanisms in inoperative position notwithstanding the position of the drum 71.

It will be understood that the control of the operation of the machine is effected by the position of the openings 115 and 116 in the strip of insulating material 114. The conditions which determine the position of said openings will more readily be understood after a consideration of the method of operation of the machine and will be referred to more particularly hereinafter.

In preparing the machine for operation the chain 26 together with the laterally movable parts associated therewith are set with respect to the chain 25 so as to accommodate the machine to boxes of desired length. The lengths of the chains 25 and 26 are adjusted so as to accommodate a desired number of box blanks with suitable spacings therebetween.

The gears 55 and 58 are adjusted so as to drive a desired one of the gears 60. As will be more readily understood from the following description this adjustment determines the spacing or distance between successive rows of staples. The gears 68 and 69 are adjusted so that the time of revolution of the drum 71 is the same as the time of a complete cycle of the chains. The spacers 103 are applied to the inner walls 29 of the chains 25, 26, so as to receive the cleats 104 therebetween. As will be seen from Fig. 8 five spacers 103 are required on each chain 25, 26, for each box blank. The sets of spacers for the different box blanks are preferably located symmetrically on the chains 25 and 26, so as to facilitate operation and simplify the preparation of the perforated strips 114.

The cleats 104 are placed upon the chains 25 and 26 as shown in Figs. 8 to 11. The walls 28 and 29 and the spacers 103 form abutments for said cleats. Sheets of veneer 150 are applied upon the upper surface of the cleats 104 so as to form the box side. The outer walls 28 of the chains 25 and 26 and the ribs 108 form abutments which facilitate the positioning of said sheets of veneer. As will be readily seen from Fig. 11, the upper surface of the cleats 104 is above the upper surfaces of the inner walls 29 and the main portion of the spacers 103 so that the veneer rests upon the cleats 104 and becomes firmly stapled thereto.

It is to be understood that any desirable number of stapling mechanisms are mounted upon the crossheads 75 and 77 and that stapling wire and binding wire is applied to each of said mechanisms, in the usual way, so that said binding wire becomes stapled securely to the box blank, the staples being driven astride the binding wire.

As will be explained hereinafter the machine is provided with means whereby the stapling mechanism is caused to stop with the crosshead 77 in its elevated position. Assuming that the crosshead 77 is in such position and that a properly perforated strip 114 is applied to the drum 71, the box blank assembly is caused to move with the chains 25 and 26 so that its rear edge is in close proximity to the zone of action of the stapling mechanism. This may be done, for example by operating the motor 46 so as to drive the chains 25 and 26, the stapling mechanism being meanwhile held arrested by the switch 149. When the desired location of the box assembly is reached the switch 149 is released but the brake 92 remains in applied position, the bridge 129 being engaged and held by the latch 127. After the rear edge of the box assembly has passed beneath the zone of activity of the stapling mechanisms the point 119 enters one of the openings 115 of the strip 114 so that the power lines 112 and 113 are connected through the windings of the solenoid 125, which results in the release of the latch 127 and the completion of the circuit through the conductor 143 and field member of the clutch 49 and through the winding of the brake 92.

The brake 92 is thereby released and a fraction of a second later the field member 49 and the armature 83 of the shaft 82 become engaged so that said shaft is caused to rotate thereby operating the stapling mechanisms through the pitmen 79 and crosshead 77. It will thus be understood that the position of the first row of staples driven into the box assembly is determined by the position of the forward edge of the opening 115 in the strip 114. After the first staple is driven the stapling mechanisms and the chains 25 and 26 are caused to operate continuously from the motor 46. Consequently the spacing of successive rows of staples depends upon the relative speeds of operation of the stapling mechanisms and chains respectively so that such spacing is controlled by the initial adjustment of the gear shift in the gear box 52.

It will be noted that only a momentary contact is necessary between the contact 119 and the drum 71 through the openings 115 to energize the solenoids 122 and 125 so that said openings may be made relatively small.

As the stapling mechanisms continue to operate the drum 71 is progressively rotated until the contact 119 is withdrawn from the opening 115 and the contact point 120 enters one of the openings 116. The latter occurs when the rear end of the first side of the box approaches the stapling mechanisms. As the shaft 82 continues to rotate the cam 93 mounted at the end thereof makes contact with the lever 94 thereby closing the switch 95 so that current passes from the point 120 by conductor 136 to conductor 137 thereby energizing the solenoids 138 and 139. This causes the retraction of the switch arms 130 and 131 which are thereupon held in retracted position by the latch 127. Consequently the windings of the field member 49 of the clutch and the brake 92 become deenergized so that the brake is applied and the stapling mechanism arrested. The brake is applied a fraction of a second before the clutch member is disengaged, and the brake assists in the separation of the clutch member. The cam 93 is so arranged that the stapling mechanism is arrested when the upper crosshead 77 is in its elevated position, thereby establishing a uniform starting point so that the first row of staples will always be driven in predetermined relation to the forward edge of the box.

The stapling mechanisms remain inoperative so as to permit the slotted and tongued ends of the cleats 104 to pass undamaged beneath the stapling mechanisms. When this object has been achieved the point 119 enters the next opening 115 presented thereto.

The circuit thus made results in the starting of the machine in the manner previously described. It is to be noted that when the contact point 119 makes contact with the drum 71 through an opening 115, current flows through the solenoid 122 and effects the withdrawal of the point 120 from the drum 71. It is thus impossible for the circuit through contact 120 to stop the stapling mechanism while the point 119 is in contact with the drum 71. The length of the perforation 116 in strip 114 can be made with less accuracy since the contact 120 will be withdrawn by the entering of the point 119 into opening 115, regardless of the length of perforation 116. It will be readily understood that by suitably positioned perforations in the strip 114, the stapling mechanism is arrested so as to avoid driving staples into the lines of junction between adjacent sides of the box blank and is arrested at the end of the box blanks remaining in arrested position until the contact point 119 makes contact with the drum 71 through an opening 115 corresponding to the front edge of a new box blank.

When the operation of the machine is disconnected by means of the coupling 98, the cam projection 100 of the clutch bar 99 makes contact with the pivoted lever 101 which closes the switch 102 and when the cam 93 causes the lever 94 to complete the circuit 112, 142, 102, 136, 95 and 137 to the solenoids 138 and 139, the stapling mechanism is arrested in its zero position, that is, with the crosshead 77 in its elevated position.

In preparing a perforated strip 114 for any particular box blank the staple spacing, that is, the distance between consecutive rows of spaces when the stapling mechanisms are working uninterruptedly, is decided upon which will enable staples to be located symmetrically and satisfactorily on both edges of the box blank.

The first opening 115 is determined so as to give the first row of staples a satisfactory position with respect to the edge thereof and at the same time permit the staples to be symmetrically placed.

The next opening, one of the 116 series, is located so that the contact 120 comes into contact with the drum 71 after the last desired row of staples has been driven into that side of the box blank. As indicated above when the crosshead 77 thereafter attains its elevated position the stapling mechanism is arrested. The next opening 115 is determined so that the staples shall be symmetrically located on the next side of the box. This may necessitate the first row of staples to be driven at a distance from the edge which is slightly different than the corresponding distance on the former side. However, it is clear that by suitable adjustment of the staple spacing this difference can be rendered practically negligible in most cases. As will be readily understood the labor of preparing a perforated strip 114 can be greatly lessened by mounting the series of spacers 103 necessary for each box blank symmetrically on the chains 25 and 26, since it is obvious that the relation between the various openings 115 and 116 is the same for each of the blanks worked upon during a cycle of the chain.

It will be understood that a different perforated strip 114 is necessary for each box blank having side sections of different dimensions, it being assumed that the length of the chains 25 and 26 and the gear adjustment of the machine are the same for the particular box blank which is to be manufactured. However, since the demand for boxes runs largely to definite sizes, it is a relatively simple matter to prepare a number of perforated strips 114 so that any particular box blank can be produced on very short order.

It will be readily understood that after passing through the stapling portion of the machine the box blanks are stitched together by the binding wires 151 which are held in position by the staples 152 and that the adjacent box blanks are joined together by the binding wires which are continuous. As the stapled box blanks approach the sprockets 31 and 33, their undersides are engaged by the rails 97 so that they become disengaged from said chains. As the box blanks are fed from the rails 97 the binding wires 151 are severed in any suitable manner to separate the box blank. As shown in Fig. 12 when the box blanks are bent into rectangular form the tongues 105 enter the slots 106. The blanks may be held in formed position in any suitable or known manner and suitable ends applied thereto.

Having thus disclosed our invention, we claim:

1. A machine for making wire bound box blanks comprising conveying means for the work, stapling mechanism, driving means therefor including an electrically controlled clutch, an electrically controlled brake for said mechanism, and conducting means moving in unison with said conveying means and adapted to start the stapling mechanism at a predetermined position on each box side and to arrest the stapling mechanism after a predetermined number of staple inserting operations to avoid driving staples into the lines of junction between adjacent sides.

2. A machine for making wire bound box blanks comprising conveying means for work, stapling mechanism, driving means therefor including an electrically controlled clutch, an electrically controlled brake for said mechanism, a series of contacts controlling a circuit which releases said clutch and applies said brake at predetermined positions of the work, and a series of contacts controlling a circuit which engages said clutch and releases said brake at other predetermined positions of the work.

3. A machine for making wire bound box blanks comprising conveying means for the work, stapling mechanism, driving means therefor including an electrically controlled clutch, an electrically controlled brake for said mechanism, a series of contacts movable in unison with said conveying means controlling a circuit which releases said clutch and applies said brake at predetermined positions of the work, and a series of contacts movable in unison with said conveying means controlling a circuit which engages said clutch and releases said brake at other predetermined positions of the work.

4. A machine for making wire bound box blanks comprising conveying means for the work, stapling mechanism, driving means therefor including an electrically controlled clutch, an electrically controlled brake for said mechanism, a series of contacts, a switch operated from said driving means controlling a circuit which releases said clutch and applies said brake so as to arrest the stapling mechanism at a predetermined position thereof and at a predetermined position of the work, and a series of contacts controlling a circuit which engages said clutch and releases said brake at other positions of the work.

5. A machine for making wire bound box blanks comprising conveying means for the work, stapling mechanism, driving means therefor including an electrically controlled clutch, an electrically controlled brake for said mechanism, a series of contacts, a switch operated from said driving means controlling a circuit which releases said clutch and applies said brake so as to arrest the stapling mechanism at a predetermined position thereof and at a predetermined position of the work, and a series of contacts movable in unison with the conveying means and controlling a circuit which engages said clutch and releases said brake at other positions of the work.

6. A machine for making wire bound box blanks comprising conveying means for the work, stapling mechanism, driving means therefor including an electrically controlled clutch, an electrically controlled brake for said mechanism, an electrically connected drum, a strip of insulating material thereon, said strip being provided with two series of perforations in predetermined locations, and contacts adapted to contact with said drum through said perforations to control the starting and stopping of the stapling mechanism.

7. A machine for making wire bound box blanks comprising conveying means for the work, stapling mechanism, driving means therefor including an electrically controlled clutch, an electrically controlled brake for said mechanism, an electrically connected drum movable in unison with the conveying means, a strip of insulating material thereon, said strip being provided with two series of perforations in predetermined locations, and contacts adapted to contact with said drum through said perforations to control the starting and stopping of the stapling mechanism.

8. A machine for making wire bound box blanks comprising conveying means for the work, stapling mechanism, driving means therefor including an electrically controlled clutch, an electrically controlled brake for said mechanism, an electrically connected drum, a strip of insulating material thereon, said strip being provided with two series of perforations, a contact member adapted to enter the perforations of one series to complete a circuit which disengages the clutch and applies the brake, and a contact member adapted to enter the perforations of the other series to complete a circuit which engages the clutch and releases the brake.

9. A machine for making wire bound box blanks comprising conveying means for the work, stapling mechanism, driving means therefor including an electrically controlled clutch, an electrically controlled brake for said mechanism, an electrically connected drum movable in unison with said conveying means, a strip of insulating material thereon, said strip being provided with two series of perforations, a contact member adapted to enter the perforations of one series to complete a circuit which disengages the clutch and applies the brake, and a contact member adapted to enter the perforations of the other series to complete a circuit which engages the clutch and releases the brake.

10. A machine for making wire bound box blanks comprising conveying means for the work, stapling mechanism, operative means connecting said conveying means and stapling mechanism so that said mechanism is adapted to drive successive rows of staples into the work at uniform space intervals, an electrically controlled clutch in the stapling mechanism drive, an electrically controlled brake for said mechanism, a series of contacts movable in unison with said conveying means controlling a circuit which releases said clutch and applies said brake at predetermined positions of the work, and a series of contacts movable in unison with said conveying means controlling a circuit which engages said clutch and releases said brake at other predetermined positions of the work.

11. A machine for making wire bound box blanks comprising conveying means for the work, stapling mechanism, operative means connecting said conveying means and stapling mechanism so that said mechanism is adapted to drive successive rows of staples into the work at uniform space intervals, an electrically controlled clutch in said stapling mechanism drive, an electrically controlled brake for said mechanism, a series of contacts movable in unison with the conveying means and a switch operated from the drive of the stapling mechanism controlling a circuit which releases said clutch and applies said brake so as to arrest the stapling mechanism at a predetermined position thereof and at a predetermined position of the work, and a series of contacts movable in unison with the conveying means controlling a circuit which engages said clutch and releases said brake at other positions of the work.

12. In a machine for making wire bound box blanks including a work conveyor, a stapling mechanism, means for arresting the stapling mechanism at a predetermined position thereof and at a predetermined position of the work, comprising electrical means to arrest said mechanism, a circuit controlling said electrical means, a contact movable with the work conveyor adapted to control said circuit, and a switch operated from the stapling mechanism for controlling said circuit.

13. A machine for making wire bound box blanks comprising conveying means for the work, stapling mechanism, operative means connecting said conveying means and stapling mechanism so that said mechanism is adapted to drive successive rows of staples into the work at uniform space intervals, an electrically controlled clutch in said stapling mechanism drive, an electrically controlled brake for said mechanism, an electrically connected drum operable in unison with said conveying means, a strip of insulating material thereon, said strip being provided with two series of perforations in predetermined locations, and contacts adapted to contact with said drum through said perforations to control the starting and stopping of the stapling mechanism.

14. A machine for making wire bound box blanks comprising conveying means for the work, stapling mechanism, interconnected driving means for said conveyor and said stapling mechanism so that said stapling mechanism is adapted to drive rows of staples into the work at regular intervals, an electrically controlled clutch in said stapling mechanism drive, an electrically controlled brake for said mechanism, an electrically connected drum movable in unison with said conveying means, a strip of insulating material thereon, said strip being provided with two series of perforations, a contact member adapted to enter the perforations of one series to complete a circuit which disengages the clutch and applies the brake, and a contact member adapted to enter the perforations of the other series to complete a circuit which engages the clutch and releases the brake.

15. A machine for making wire bound box blanks, comprising conveying means for said blanks, driving means for said conveying means whereby said blanks are continuously moved in a forward direction, stapling mechanism, driving means for said stapling mechanism including a clutch element, a clutch element in said conveyor driving means adapted to engage the clutch element in the drive for said stapling mechanism, and electrical means for disengaging said clutch elements for arresting said stapling mechanism at predetermined intervals.

In witness whereof, we hereunto subscribe our names to this specification.

DANIEL G. MEIKLE.
CHARLES T. PAUGH.